is(12) United States Patent
Jeon (10) Patent No.: US 10,195,785 B2
(45) Date of Patent: Feb. 5, 2019

(54) PRINTING APPARATUS FOR BUILDING THREE-DIMENSIONAL OBJECT

(71) Applicant: LG ELECTRONICS INC., Seoul (KR)

(72) Inventor: Sungil Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/557,725

(22) PCT Filed: Apr. 23, 2015

(86) PCT No.: PCT/KR2015/004049
§ 371 (c)(1),
(2) Date: Sep. 12, 2017

(87) PCT Pub. No.: WO2016/143942
PCT Pub. Date: Sep. 15, 2016

(65) Prior Publication Data
US 2018/0065293 A1 Mar. 8, 2018

(30) Foreign Application Priority Data
Mar. 12, 2015 (KR) ........................ 10-2015-0034615

(51) Int. Cl.
*B41J 2/165* (2006.01)
*B29C 64/112* (2017.01)
(Continued)

(52) U.S. Cl.
CPC ............ *B29C 64/112* (2017.08); *B29C 64/35* (2017.08); *B33Y 30/00* (2014.12); *B33Y 40/00* (2014.12)

(58) Field of Classification Search
CPC .............................. B41J 2/165; B29C 64/112
See application file for complete search history.

(56) References Cited

U.S. PATENT DOCUMENTS

2005/0146554 A1 7/2005 Asanuma et al.
2006/0061618 A1* 3/2006 Hernandez ........... B41J 2/16532
347/29
(Continued)

*Primary Examiner* — Jason S Uhlenhake
(74) *Attorney, Agent, or Firm* — Birch, Stewart, Kolasch & Birch, LLP (57) ABSTRACT

Provided is a 3D printing apparatus. The 3D printing apparatus includes a build tray on which a building object is layered, a head unit including a plurality of nozzles for spraying a source ink having a gel state onto the build tray, a curing lamp curing the source ink sprayed onto the build tray, and a maintenance unit disposed under the head unit to clean the source ink attached to the nozzles. The maintenance unit includes a case, a nozzle cleaner accommodated in the case to clean the source ink attached to the nozzles by horizontally moving in contact with the head unit, a moving unit disposed in the case, the moving unit being connected to the nozzle cleaner to move the nozzle cleaner in a front/rear direction of the head unit. The nozzle cleaner includes a cleaner housing connected to the moving unit and a cleaning part mounted on the cleaner housing to perform a suction operation for suctioning the ink attached to the nozzles and a wiping operation for wiping the ink the attached to the nozzles.

20 Claims, 6 Drawing Sheets

(51) Int. Cl.
*B33Y 30/00* (2015.01)
*B33Y 40/00* (2015.01)
*B29C 64/35* (2017.01)

(56) References Cited

U.S. PATENT DOCUMENTS

2007/0263029 A1* 11/2007 Watanabe ............ B41J 2/16532
　　　　　　　　　　　　　　　　　　　　　347/33
2008/0042321 A1　　2/2008 Russell et al.
2008/0286021 A1* 11/2008 Asami .................. B41J 2/16538
　　　　　　　　　　　　　　　　　　　　　399/351
2010/0177142 A1　　7/2010 Heo

* cited by examiner

PRINTING APPARATUS FOR BUILDING THREE-DIMENSIONAL OBJECT

CROSS REFERENCE TO RELATED APPLICATIONS

This application is the National Phase of PCT International Application No. PCT/KR2015/004049, filed on Apr. 23, 2015, which claims priority under 35 U.S.C. 119(a) to Patent Application No. 10-2015-0034615, filed in the Republic of Korea on Mar. 12, 2015, all of which are hereby expressly incorporated by reference into the present application.

TECHNICAL FIELD

The present disclosure relates to a printing apparatus for building a three-dimensional (3D) object.

BACKGROUND ART 3D printing technologies that have recently started to receive attention have enhanced in degree of freedom with respect to a configuration of a product because a mold required in a typical mass production manner is not necessary at all, and also constraint conditions needed for molding the product in the mold are removed. For example, when a product is produced by using injection molding, in order to extract the product from a mold, the product needs to have no undercut and have a predetermined draft angle. Also, a spatially complicated shape of the product is one of limitations that may not be achieved by the mold.

However, the 3D printing technologies may enable a component, which has a shape that is impossible to be molded in the mass production manner using the mold, to be molded and also mold a component even in an assembled state. Thus, components having various conditions may be built.

Like this, the 3D printing technologies have brought radical change in approach to the shape of the product and production of the product to almost resolve difficulties when manufacturing a mock-up or prototype.

The 3D printing technologies may be classified into a photocuring process, a sintering process, a fused deposition modeling (FDM) manner, a color jetting printing manner, a multi jetting printing or polyjet manner in which the photocuring process is mixed with the color jetting printing manner, and a thin film laminating manner (LOM, PLT, PSL) according to the processes.

Also, sources used for the 3D printing technologies may be classified into a solid phase, a liquid phase, and a powder type according to phases of the sources. In detail, the solid phase source is mainly used for the FDM printing apparatus. Poly lactic acid (PLA), acrylonitrile-butadiene-styrene (ABS) resin, and styrene which are thermo-plastic resins are used as main materials of the solid phase source and are processed in a filament form.

Also, the liquid phase source is a gel type source and mainly used for the photocuring process. The power type source is used for a printing apparatus using a selective laser sintering (SLS) manner that is one of a sintering manner. Here, power type polymer or a metal source sintered by a laser is a main material of the power type source.

In case of the 3D printing apparatus using the color jetting printing manner or polyjet manner, since a liquid source (hereinafter, referred to as an "ink") is sprayed through a nozzle of a printing head, the ink may be formed on a nozzle tip. Also, the ink formed on the nozzle tip may be hardened or cured by UV light reflected from a curing lamp to block the nozzle. Particularly, when the ink formed on the nozzle tip is cured by the UV light that is reflected from the UV lamp, the printing head itself has to be replaced.

Also, the head for the 3D printing apparatus is very expensive. Also, since the ink has very high viscosity, the printing head may be damaged. Thus, it may be necessary to provide a strong cleaning unit for cleanly cleaning the nozzle of the printing head after the printing is completed, before the printing starts, or after a long resting state.

In case of the 3D printing apparatus using the typical inkjet manner, which is disclosed in US Patent Registration No. 7744364, a blade for wiping a nozzle is provided to clean a nozzle tip of the printing head.

However, in case of the nozzle cleaning mechanism according to the related art, it may be difficult to completely remove an ink remaining on the inside of the printing head and an ink attached to the nozzle tip.

DISCLOSURE OF INVENTION

Technical Problem

The present disclosure has been proposed to improve the above-described limitations.

Solution to Problem

In one embodiment, a 3D printing apparatus includes: a build tray on which a building object is layered; a head unit including a plurality of nozzles for spraying a source ink having a gel state onto the build tray; a curing lamp curing the source ink sprayed onto the build tray; and a maintenance unit disposed under the head unit to clean the source ink attached to the nozzles, wherein the maintenance unit includes: a case; a nozzle cleaner accommodated in the case to clean the source ink attached to the nozzles by horizontally moving in contact with the head unit; a moving unit disposed in the case, the moving unit being connected to the nozzle cleaner to move the nozzle cleaner in a front/rear direction of the head unit, wherein the nozzle cleaner includes: a cleaner housing connected to the moving unit; and a cleaning part mounted on the cleaner housing to perform a suction operation for suctioning the ink attached to the nozzles and a wiping operation for wiping the ink the attached to the nozzles in a state where an upper surface is in contact with the nozzle.

Advantageous Effects of Invention

The 3D printing apparatus according to the embodiment may have following effects.

First, the purging function for discharging the ink remaining in the printing head in the cleaning mode of the printing head and the suction process for suctioning the waste ink discharged in the purging process may be performed at the same time to improve durability of the printing head.

Second, since the negative pressure is generated in the suction part for suctioning the waste ink, the suction rate of the waste ink may be high. Therefore, since an amount of remaining ink that is wiped by the wiping member is minimized, the lifecycle of the wiping member may increase.

MODE FOR THE INVENTION

Hereinafter, a three-dimensional (3D) printing apparatus according to embodiments will be described in detail with reference to the accompanying drawings.

Figure 1:
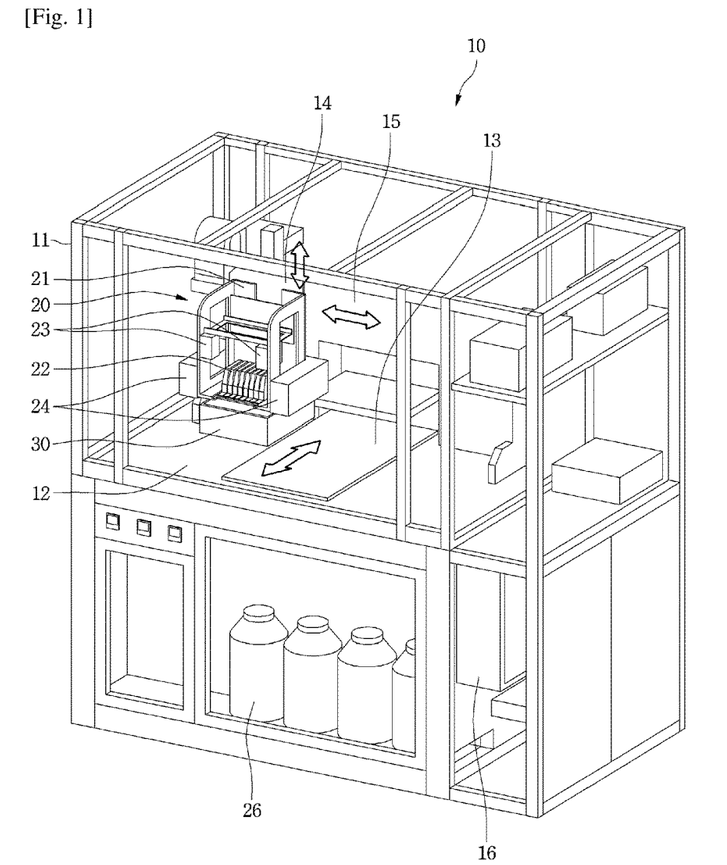
FIG. 1 is a perspective view illustrating an outer appearance of a 3D printing apparatus according to an embodiment.
Figure 2:
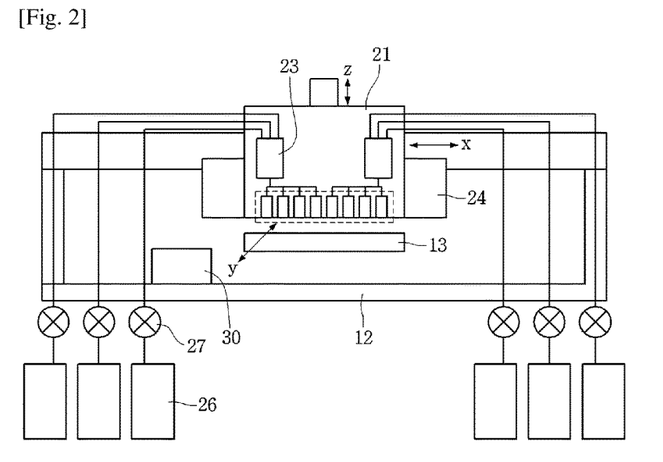
FIG. 2 is a view for explaining an operation principle of the 3D printing apparatus according to an embodiment.

FIG. 1 is a perspective view illustrating an outer appearance of a 3D printing apparatus according to an embodiment, and FIG. 2 is a view for explaining an operation principle of the 3D printing apparatus according to an embodiment.

Referring to FIGS. 1 and 2, a 3D printing apparatus 10 according to an embodiment may include a frame 11 defining an outer appearance, a base plate 12 vertically partitioning the frame 11, a build tray 13 moving on the base plate 12 in a front/rear (y-axis) direction of the 3D printing apparatus and on which an object to be three-dimensionally printed (hereinafter, referred to as a building object) is layered, a printing module 20 layering the building object on the build tray 13 while moving above the base plate 120 in a left/right (x-axis) direction and vertical (z-axis) direction of the 3D printing apparatus, a plurality of source tanks 26 accommodated in a space defined below the base plate 12, and a control box 16 controlling an overall operation of the 3D printing apparatus 10 including an operation of the printing module 20.

Here, the printing module 20 may be movable in the x-axis and z-axis directions by an x-axis moving guide part 15 and a z-axis moving guide part 14.

The printing module 20 may include a head carriage 21 connected to the x-axis moving guide part 15 and the z-axis moving guide part 14, a head unit 22 mounted on an inner bottom surface of the head carriage 21, a mixing tank 23 mounted above the head unit 22 inside the head carriage 21, a curing lamp 24 mounted on each of left and right sides of the head unit 22, and a maintenance unit 30 placed on the base plate 12 below the head carriage 21.

In detail, the head unit 22 may be provided as one module in which a plurality of printing heads are arranged in the x-axis direction. A plurality of nozzles are arranged in a longitudinal direction of the printing heads on bottom surfaces of the printing heads constituting the head unit 22, respectively. Here, the head unit 22 may have the same structure as a printing head mounted on an existing 2D inkjet printer except for a kind of source sprayed through the nozzles and a configuration thereof.

If the 3D building object is a color solid, the mixing tank 23 may be used as a unit for mixing a plurality of color inks. That is, inks having colors different from each other, which are respectively supplied into the plurality of source tanks 26, may be supplied into the mixing tank 23 and then mixed with each other to generate a desired color. Also, the ink having a new color, which is generated in the mixing tank 23, may be uniformly distributed into the head unit 22. Although the plurality of mixing tanks 23 are mounted inside the head carriage 21 as illustrated in FIGS. 1 and 2, the present disclosure is not limited thereto. For example, a single mixing tank 23 may be provided. An agitator for mixing the inks supplied from the plurality of source tanks 26 may be mounted inside the mixing tank 23. Also, a supply pump 27 may be mounted between the source tank 26 and the mixing tank 23 to allow the colored ink stored in the source tank 26 to be smoothly supplied into the mixing tank 23.

The curing lamp 24 may be an ink curing unit for curing the ink sprayed from the nozzle of the head unit 22 by using ultraviolet (UV) light. Thus, UV light having a specific frequency may be irradiated onto a surface of the sprayed ink to cure the sprayed ink. Also, the curing lamp 24 may be mounted on each of left and right edges of the head unit 22. That is, the UV light irradiated from the curing lamp 24 disposed at the left side may cure the sprayed link while moving in the x-axis direction from the left side to the right side of the head unit 22. The UV light irradiated from the curing lamp 24 disposed at the right side may cure the sprayed link while moving in a ? X-axis direction from the right side to the left side of the head unit 22.

The maintenance unit 30 may operate when reaching a time period at which the nozzle of the head unit 22 has to be cleaned. The maintenance unit 30 cleanly wipes an ink residue attached to the nozzle of the head unit 22.

In the 3D printing apparatus 10 having the above-described structure, the head unit 22 moves in the x-axis direction and then is disposed above the build tray 23. Also, the head unit 22 sprays the ink while moving in ±x-axis and ±z-axis directions according to a design drawing provided from a main computer. Simultaneously, a desired 3D building object is layered on a top surface of the build tray 13 while the build tray 13 moves in a ±y-axis direction. Also, the 3D printing apparatus 10 may be programmed so that the maintenance unit 30 operates after a power is applied to the printing apparatus 10 to become in a printing standby state, or the printing is completed or before an ink having a specific color is entirely sprayed, and thus an ink having a different color is replaced.

Hereinafter, the maintenance unit 30 provided in the 3D printing apparatus 10 according to an embodiment will be described in detail with reference to the accompanying drawings.

Figure 3:
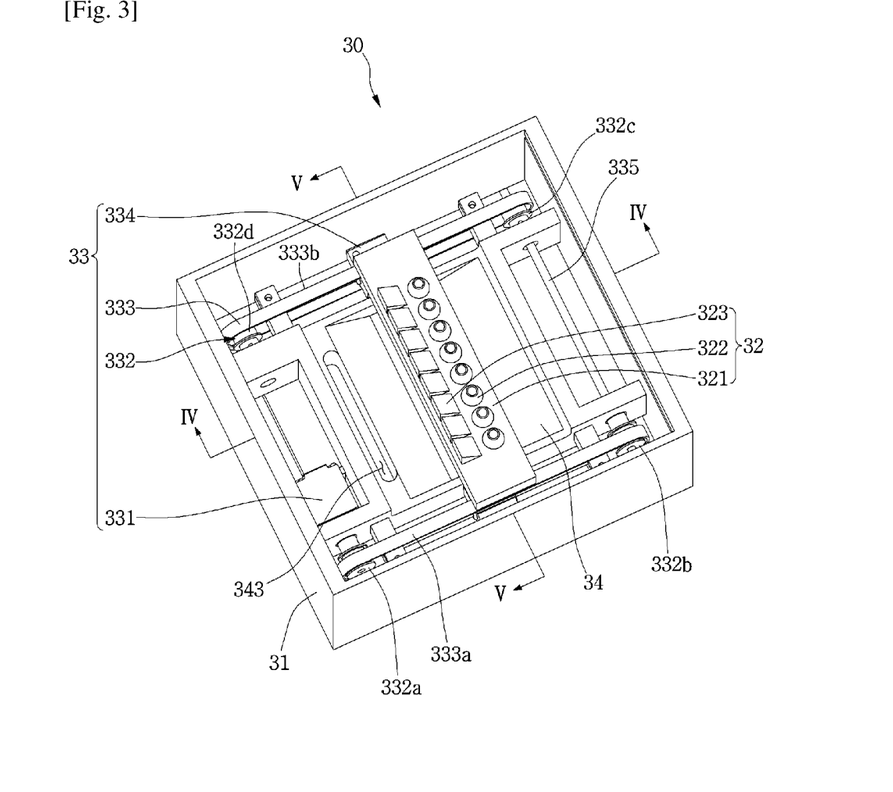
FIG. 3 is a perspective view illustrating an inner configuration of a maintenance unit of the 3D printing apparatus according to an embodiment.
Figure 4:
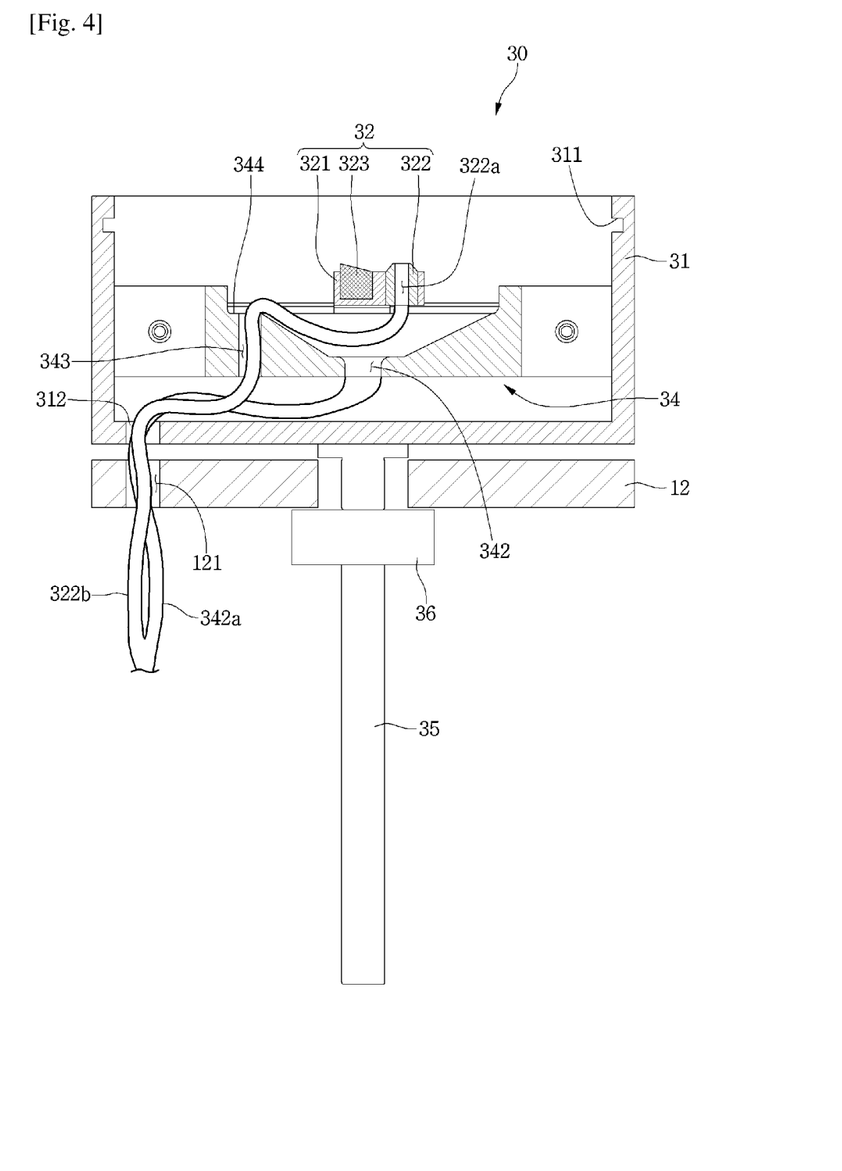
FIG. 4 is a longitudinal cross-sectional view taken along line IV-IV of FIG. 3.
Figure 5:
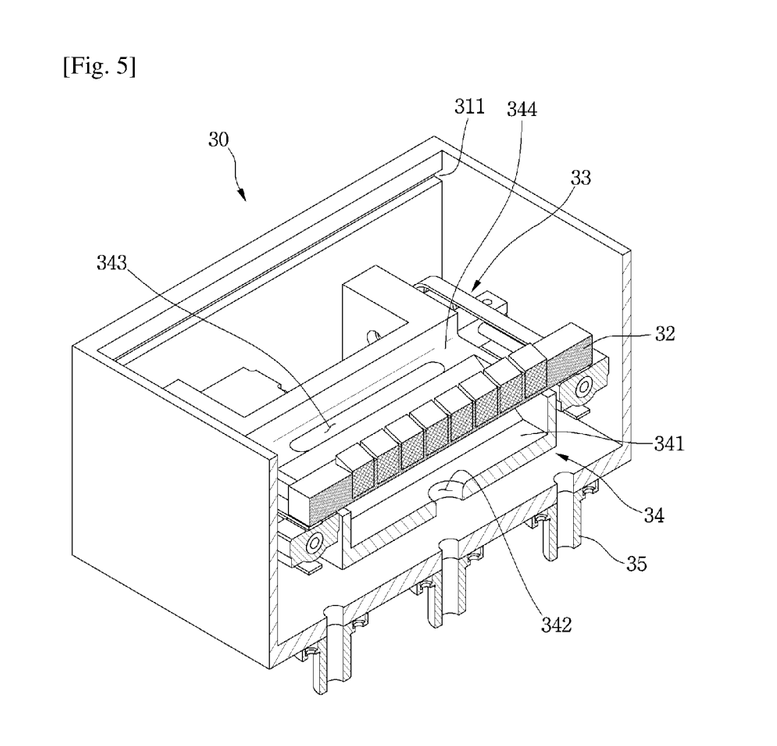
FIG. 5 is a cutaway perspective view taken along line V-V of FIG. 3.

FIG. 3 is a perspective view illustrating an inner configuration of the maintenance unit of the 3D printing apparatus according to an embodiment, FIG. 4 is a longitudinal cross-sectional view taken along line IV-IV of FIG. 3, and FIG. 5 is a cutaway perspective view taken along line V-V of FIG. 3.

Referring to FIGS. 3 to 5, the maintenance unit 30 of the 3D printing apparatus according to an embodiment may include a case 31, an elevation module mounted on a bottom surface of the case 31 to vertically move the case 31, a nozzle cleaner 32 provided in the case 31 to clean the head unit 22, a cleaner driving unit 33 moving the nozzle cleaner 32 in the front/rear (the y-axis) direction, and a waste ink collection tray 34 receiving a waste ink generated after the cleaning of the nozzle to store the received waste ink.

In detail, the elevation module may include an elevation shaft 35 mounted on the bottom surface of the case 31 and an elevation motor 36 vertically moving the elevation shaft 35. As the elevation shaft 35 moves, the maintenance unit 30 may ascend or descend from a top surface of the base plate 12.

Also, the nozzle cleaner 32 may include a cleaner housing 321, a suction member 322 mounted on the cleaner housing 321, and a wiping member 323. In detail, the suction member 322 may suction the ink attached to the nozzle of the head unit 32 by using a negative pressure. The wiping member 323 may wipe the ink attached to the nozzle. The wiping member 323 may have the substantially same objective and function as a wiping member applied to a maintenance unit of an existing 2D inkjet printer. However, since an ink used for the 2D inkjet printer is different from the ink used for the 3D printing apparatus according to an embodiment, the wiping member may be formed of a material different from that of the wiping member used for the 2D inkjet printer. That is, the wiping member may be formed of a material that is capable of effectively wiping the sprayed source.

A suction hole 322a may be defined in a central portion of the suction member 322 to absorb the ink. The suction hole 322 may have a shape that passes from a top surface to a bottom surface of the suction member 322.

Also, the wiping member 323 may be disposed at a rear side of the suction member 322 with respect to a moving direction of the nozzle cleaner 32 to clean the nozzle. That is, when the nozzle cleaner 32 moves to perform the cleaning in a state where the nozzle cleaner 32 is closely attached to the bottom surface of the head unit 22, an ink drop formed on the nozzle may be absorbed through the suction member 322, and then, the wiping member 323 may wipe the nozzle while passing over the nozzle.

The wiping member 323 may have a top surface that is inclined at a predetermined angle. As the nozzle cleaner 32 moves, the nozzle cleaner 32 may contact the nozzle of the head unit 22 from the lowest portion of the inclination surface. Also, as the nozzle cleaner 32 further moves, the top surface of the wiping member 323 may be pressed and thus deformed. As a result, a compression force between the nozzle of the head unit 22 and the top surface of the wiping member 323 may increase. Thus, the ink attached to the nozzle may be more cleanly cleaned.

In the current embodiment, the wiping member 323 is disposed at a rear side of the suction member 322, and the suction member 322 and the wiping member 323 which have numbers corresponding to that of printing head constituting the head unit 22 are arranged in a left/right direction of the cleaning housing 321. That is, one row of the suction member 322 and the wiping member 323 are correspondingly disposed on one printing head.

However, in another embodiment, a pair of wiping members 323 may be disposed in a front/rear direction of the cleaning housing 321, and the suction member 322 may be disposed between the pair of wiping members 323. Also, as illustrated in FIGS. 3 to 5, the plurality of suction members each of which has an upper end with a truncated cone shape may be arranged in a width direction of the cleaning housing 321. Also, a single suction hole having a long hole shape may be disposed between the front and rear wiping members. That is, a suction member lengthily extending in the width direction of the cleaning housing 321 may be applied.

According to further another embodiment, the suction hole may be defined in a central portion of the wiping member 323 to perform the suction function and the wiping function by using the single wiping member 323. Also, the suction hole may be vertically defined inside the wiping member 323. Here, the suction hole may be defined in one position of a front end, a central portion, and a rear end of the wiping member 323.

Also, two wiping member each of which has the suction hole may be arranged in the front/rear direction. Thus, the nozzle cleaners 32 having the same size may move once to perform the suction and wiping functions twice. As a result, the nozzle may be more cleanly cleaned.

The cleaner driving unit 33 for reciprocating the nozzle cleaner 32 in the front/rear direction may include a pair of slide pads 334 respectively connected to left and right edges of the cleaner housing 321, a pair of rotation belts 333 having a caterpillar shape and respectively connected to the pair of slide pads 334, a plurality of pulleys 332 respectively disposed on inner front and rear ends of the pair of rotation belts 333, and a driving motor 331 connected to one of the plurality of pulleys 332 to rotate the pulley 332.

The pair of rotation belts 333 may include a first rotation belt 333a connected to the left slide pad 334 of the nozzle cleaner 32 and a second rotation belt 333b connected to the right slide pad 334 of the nozzle cleaner 32.

Also, the plurality of pulleys 332 may include first and second pulleys 332a and 332b respectively connected to front and rear ends of the first rotation belt 333a and third and fourth pulleys 332c and 332d respectively connected to front and rear ends of the second rotation belt 333b. Also, the rotation shaft of the driving motor 331 may be connected to one of the first to fourth pulleys 332a to 332d. Although the driving motor 331 is connected to the first pulley 332a in the current embodiment, the present disclosure is not limited thereto.

Also, the second pulley 332b and the third pulley 332c may be connected to each other by a power transmission shaft 335. Thus, a rotation force generated by the driving motor 331 may be transmitted into the first pulley 332a, and a rotation force of the first pulley 332a may be transmitted into the second pulley 332b through the first rotation belt 333a. Also, a rotation force of the second pulley 332b may be transmitted into the third pulley 332c through the power transmission shaft 335, and a rotation force of the third pulley 332c may be transmitted into the fourth pulley 332d by the second rotation belt 333b.

Also, a moving unit having a different shape such as a rack/pinion structure, but is not limited to the above-described pulley/belt structure, may be applied as the moving unit for moving the nozzle cleaner 32.

The waste ink collection tray 34 may be disposed below the nozzle cleaner 32 to collect a waste ink discharged from the nozzle of the head unit 22 in a purging process (that will be described later).

In detail, a waste ink collection chamber 341 may be provided in the waste ink collection tray 34. Also, the waste ink collection chamber 341 may have front and rear walls which are inclined toward a central portion of a bottom part from upper ends of front and rear surfaces of the waste ink collection tray 34. Also, a waste ink discharge hole 342 may be defined in a center of the bottom part of the waste ink collection tray 34. Thus, the waste ink dropping to the front and rear walls of the waste ink collection tray 34 may flow toward the waste ink discharge hole 342 along the front and rear walls. Also, a discharge tube 342a is connected to the waste ink discharge hole 342 to waste the waste ink to the outside of the maintenance unit 30.

Also, a cleaner seating part 344 may be stepped on a top surface of the front end of the waste ink collection tray 34. In detail, when the nozzle cleaning function is not performed, the nozzle cleaner 32 may be maintained in the state where the nozzle cleaner 32 is seated on the cleaner seating part 344. Also, when a nozzle cleaning mode is selected to start the cleaning of the nozzle, the nozzle cleaner 32 may horizontally move from the cleaner seating part 344 toward the rear end of the waste ink collection tray 34 to clean the nozzle.

Also, a suction tube guide hole 343 may be defined in a horizontal surface of the cleaner seating part 344, i.e., a surface on which the nozzle cleaner 32 is seated. In detail, the suction tube guide hole 343 may vertically extend from the top surface of the cleaner seating part 344 to pass through a bottom part of the waste ink collection tray 34. Also, a suction tube 322b may be connected to a lower end of the suction hole 322a defined in each of the plurality of suction members 322, and the plurality of section tubes 322b connected to the plurality of section members 322 may pass through the suction tube guide hole 343 and then be guided to the outside of the waste ink collection tray 34.

Also, the case 32 may have a hexahedral shape with an opened top surface. The top surface of the case 31 may be selectively opened and closed by the maintenance cover 37. Also, a cover fitting groove 311 into which an edge of the maintenance cover 37 is inserted may be defined in an inner circumferential surface of a sidewall of the case 31. Also, a detection unit including a detection switch may be mounted inside the cover fitting groove 311 to allow the control unit to recognize the detachment of the maintenance cover 37.

Also, tube through-holes 312 and 121 may be defined in one side of the bottom surface of the case 31 and one side of the base plate 12 so that the discharge tube 342a and the plurality of suction tubes 322b extend to the outside of the 3D printing apparatus.

Figure 6:
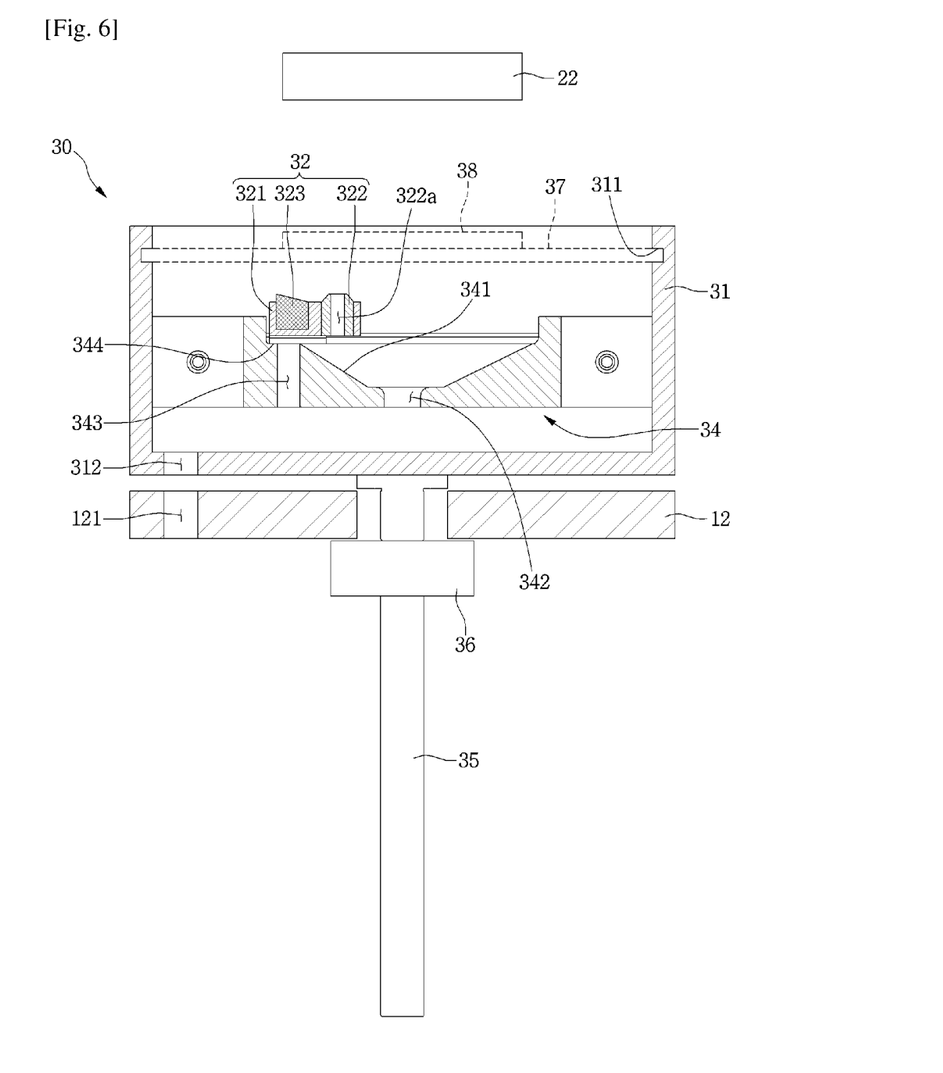
FIG. 6 is a longitudinal cross-sectional view taken along line IV-IV of FIG. 3 and illustrates an inner configuration of the maintenance unit when a nozzle cleaner is in an initial state.

FIG. 6 is a longitudinal cross-sectional view taken along line IV-IV of FIG. 3 and illustrates an inner configuration of the maintenance unit when the nozzle cleaner is in an initial state.

Referring to FIG. 6, in a state where the nozzle cleaning function is not selected, the top surface of the case 31 of the maintenance unit 30 may be maintained in the closed state by the maintenance cover 37. Also, a cap rubber 38 is mounted on the top surface of the maintenance cover 37. When the printing process is not performed, the head unit 22 may be maintained in a state where the head unit 22 is closely attached to the nozzle.

In detail, it may be necessary to prevent foreign substances from being introduced into the nozzle or prevent a source having a gel state within the nozzle from being cured by contacting air when at a time point at which the printing process is not performed, i.e., prior to the printing even though a power of the 3D printing apparatus is turned on or off. For this, the cap rubber 38 may be maintained in the cap rubber 38 is closely attached to the nozzle to fundamentally prevent air containing foreign substances from being introduced into the nozzle.

Also, when the nozzle cleaning function is not performed, the nozzle cleaner 32 may be maintained in the state where the nozzle cleaner 32 is seated on the cleaner seating part 344 disposed on an edge of the top surface of the waste ink collection tray 34. Also, when the nozzle cleaning mode is selected, a purging function may be performed to discharge the ink remaining in the head unit 22 into the waste ink collection tray 34 through the nozzle. Also, as illustrated in FIG. 4, the nozzle cleaner 32 may suction and wipe the ink attached to the nozzle while horizontally moving to a rear end of the waste ink collection tray 34.

Hereinafter, a nozzle cleaning operation of the maintenance unit will be described in detail with reference to flowchart of FIG. 7.

Figure 7:
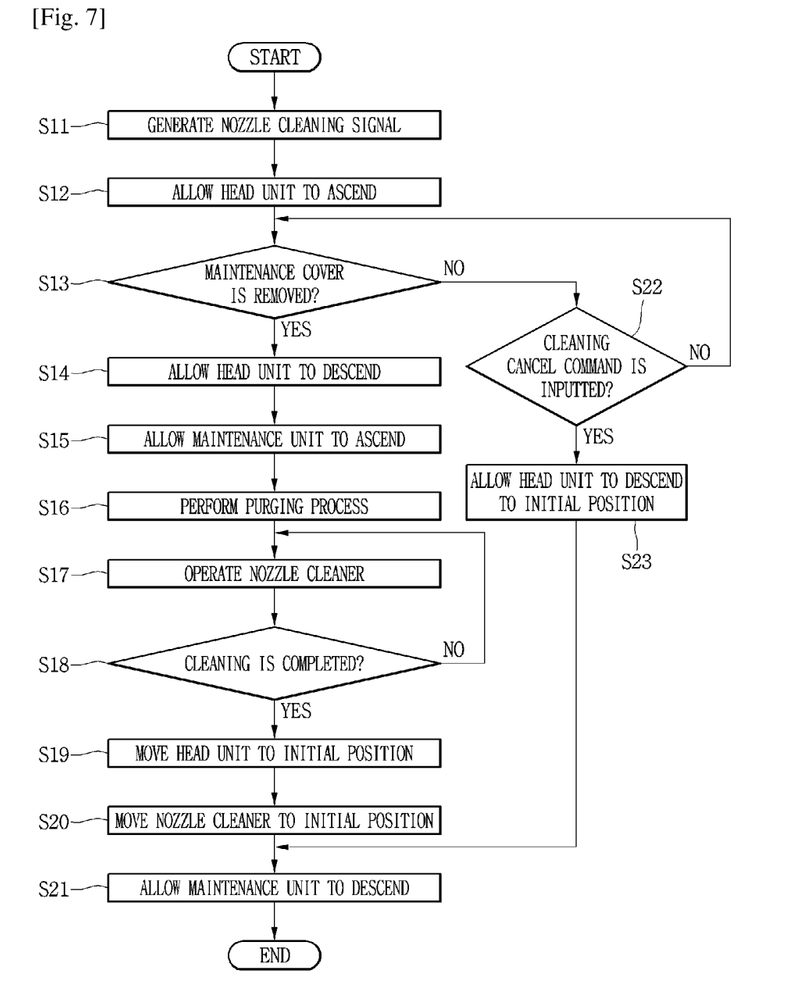
FIG. 7 is a flowchart illustrating a method for cleaning a nozzle of the 3D printing apparatus according to an embodiment.

FIG. 7 is a flowchart illustrating a method for cleaning a nozzle of the 3D printing apparatus according to an embodiment.

Referring to FIG. 7, a 3D printing apparatus according to an embodiment may be an apparatus that sprays an ink having a gel state onto a build tray 13 through a head nozzle to repeatedly perform a curing process on the sprayed ink by using UV light, thereby layering a building object on the build tray 13.

When a printing process is not performed, in order to prevent an ink from remaining on a nozzle of a printing head, it may be necessary to periodically clean a nozzle of a maintenance unit in a state where a preset condition is satisfied to prevent a residual ink from blocking the nozzle by curing of the ink.

First, in operation S11, a condition in which the nozzle of the printing head has to be cleaned may be programmed in a control unit of the 3D printing apparatus 10, and then, when the nozzle cleaning condition is satisfied, a nozzle cleaning signal may be generated through a display unit of the 3D printing apparatus.

In detail, the nozzle cleaning signal may be generated as a sound signal, an optical signal, a character signal, and the like so that a user recognizes the nozzle cleaning signal.

In operation S12, while the nozzle cleaning signal is generated, the control unit controls a head unit 22, i.e., the printing head to descend. The printing head may ascend to separate an end of the nozzle from a cap rubber 38 so that a maintenance cover 37 is easily separated from a case 31.

Also, in operation S13, the control unit determines whether the maintenance cover 37 is separated from the case 31 by the user. In detail, when the maintenance cover 37 is removed, whether the maintenance cover 37 is separated may be detected by a detection sensor mounted on the case 31, and then a detection signal may be transmitted into the control unit.

When the control unit detects the separation of the maintenance cover 37, the head unit 22 may descend in operation S14, and simultaneously or successively, the maintenance unit 30 may ascend in operation S15. In detail, the end of the nozzle of the head unit 22 may contact a nozzle cleaner 32 to become a cleaning standby state by the ascending of the maintenance unit 30 and the descending of the head unit 22.

Here, when a cleaning cancel command is inputted by the user before the maintenance cover is removed in operation S22, the head unit 22 may descend to move to its initial position in operation S23.

In operation S16, when the nozzle cleaner 32 is closely attached to a bottom surface of the head unit 22, a purging process may be performed. The purging process may represent a process in which a source ink remaining in the nozzle of the head unit 22 is pushed at a high pressure by using a purge pump (not shown) to discharge the ink remaining in the nozzle to the outside.

When the purging process is ended, the nozzle cleaner 32 may clean the nozzle while moving in a y-axis direction from a front end to a rear end of the head unit 22. That is, a suction member 322 disposed on the nozzle cleaner 32 may suction the ink formed on the nozzle, and a wiping member 323 may pass while wiping the end of the nozzle. Here, the suction member 322 may be connected to a suction pump. When the suction pump operates, a negative pressure may be generated in the suction member 322 to suction the ink attached to the nozzle.

Here, the suction pressure generated by the suction pump, i.e., the negative pressure may be a vibration-type variable negative pressure. That is, the increase and decrease of the suction pressure may be periodically repeated. Thus, the source ink attached to the nozzle may be better removed.

Here, the purging process may be performed once. Alternatively, if a printing stop period is longer, the purging process may be performed several times before the printing starts. In addition, the 3D printing apparatus may be programmed so that the purging process is performed several times to clean the nozzle while the nozzle cleaner moves. That is, the 3D printing apparatus maybe programmed so that the nozzle cleaning process including a set of purging, suction, and wiping processes is performed several times.

Of cause, when the nozzle cleaner having a structure in which the suction hole is defined in the wiper is applied, the suction and wiping functions may be performed at the same time.

Also, when the nozzle cleaning is completed according to the set program in operation S18, the head unit 22 may ascend to move to its initial position in operation S19, and the nozzle cleaner 32 may also advance to return to its original position. That is, the nozzle cleaner 32 may be seated on the cleaner seating part 344 of the waste ink collection tray 34.

Thereafter, in operation S21, the maintenance unit 21 may also descend to move to its initial position.

According to the nozzle cleaning algorithm, since the suction and wiping processes are simultaneously or successively performed after the purging process, it may prevent the ink from being attached to the end of the nozzle or prevent the nozzle from being blocked by the curing of the UV lamp.

The invention claimed is:

1. A 3D printing apparatus comprising:
   a build tray on which a building object is layered;
   a head unit including a plurality of nozzles for spraying a source ink onto the build tray, the source ink having a gel state; a curing lamp for curing the source ink sprayed onto the build tray; and
   a maintenance unit disposed under the head unit to clean the source ink attached to the nozzles,
   wherein the maintenance unit comprises:
      a case;
      a nozzle cleaner accommodated in the case to clean the source ink attached to the nozzles by horizontally moving in contact with the head unit; and
      a moving unit disposed in the case, the moving unit being connected to the nozzle cleaner to move the nozzle cleaner in a front/rear direction of the head unit,
   wherein the nozzle cleaner comprises:
      a cleaner housing connected to the moving unit; and
      a cleaning part mounted on the cleaner housing performing a suction operation and a wiping operation,
   wherein the cleaning part comprises:
      a suction member having a suction hole that generates a negative pressure to suction the ink attached to the nozzles when performing the suction operation; and
      a wiping member absorbing and wiping the ink attached to the nozzles when performing the wiping operation, and
   wherein the suction member performs the suction operation in a state that the suction hole is in contact with the nozzles.

2. The 3D printing apparatus according to claim 1, wherein
   the wiping member is disposed at a position that is spaced apart from the suction member in a moving direction of the nozzle cleaner.

3. The 3D printing apparatus according to claim 2, wherein the negative pressure is variable.

4. The 3D printing apparatus according to claim 2, wherein the head unit comprises a plurality of printing heads arranged at a predetermined distance, and
   wherein the cleaning part comprises a plurality of cleaning parts equal in number to that of the plurality of printing heads.

5. The 3D printing apparatus according to claim 4, further comprising a suction tube connected to the suction hole.

6. The 3D printing apparatus according to claim 5, wherein the moving unit comprises:
   a pair of slide pads respectively mounted on both side ends of the nozzle cleaner;
   a pair of rotation belts respectively connected in one body to the pair of slide pads;
   a plurality of pulleys respectively disposed on inner front and rear ends of each of the pair of rotation belts; and
   a driving motor connected to one of the plurality of pulleys to provide power.

7. The 3D printing apparatus according to claim 1, wherein
   the suction hole is defined in one side of the wiping member.

8. The 3D printing apparatus according to claim 7, wherein the suction hole is defined in one side of a front end, a central portion, and a rear end of the wiping member.

9. The 3D printing apparatus according to claim 7, wherein the negative pressure is variable.

10. The 3D printing apparatus according to claim 7, wherein the head unit comprises a plurality of printing heads arranged at a predetermined distance, and
    wherein the cleaning part comprises a plurality of cleaning parts equal in number to that of the plurality of printing heads.

11. The 3D printing apparatus according to claim 10, further comprising a suction tube connected to the suction hole.

12. The 3D printing apparatus according to claim 11, wherein the moving unit comprises:
    a pair of slide pads respectively mounted on both side ends of the nozzle cleaner;
    a pair of rotation belts respectively connected in one body to the pair of slide pads;
    a plurality of pulleys respectively disposed on inner front and rear ends of each of the pair of rotation belts; and
    a driving motor connected to one of the plurality of pulleys to provide power.

13. The 3D printing apparatus according to claim 1, wherein the wiping member comprises:
    a first wiping member for absorbing and wiping the ink attached to the nozzles; and
    a second wiping member disposed at a position that is spaced a predetermined distance from the first wiping member in a moving direction of the nozzle cleaner to absorb and wipe the ink attached to the nozzles again, and
    wherein the suction member is disposed between the first wiping member and the second wiping member.

14. The 3D printing apparatus according to claim 13, wherein the negative pressure is variable.

15. The 3D printing apparatus according to claim 13, wherein the head unit comprises a plurality of printing heads arranged at a predetermined distance, and wherein the cleaning part comprises a plurality of cleaning parts equal in number to that of the plurality of printing heads.

16. The 3D printing apparatus according to claim 15, further comprising a suction tube connected to the suction hole.

17. The 3D printing apparatus according to claim 16, wherein the moving unit comprises:
- a pair of slide pads respectively mounted on both side ends of the nozzle cleaner;
- a pair of rotation belts respectively connected in one body to the pair of slide pads;
- a plurality of pulleys respectively disposed on inner front and rear ends of each of the pair of rotation belts; and
- a driving motor connected to one of the plurality of pulleys to provide power.

18. The 3D printing apparatus according to claim 1, wherein the maintenance unit further comprises a waste ink collection tray for collecting a waste ink discharged from the nozzles in a purging process for discharging the ink remaining in the nozzles, the waste ink collection tray having a waste ink discharge hole in a bottom surface thereof to discharge the collected waste ink.

19. The 3D printing apparatus according to claim 18, further comprising a discharge tube connected to the waste ink discharge hole.

20. The 3D printing apparatus according to claim 1, further comprising:
- a maintenance cover detachably mounted on an opened top surface of the case; and
- a cap rubber mounted on a top surface of the maintenance cover,
- wherein, when the printing process is not performed, an end of each of the nozzles is maintained in a state where the ends of the nozzles are closely attached to the cap rubber.

* * * * *